US012151507B2

(12) United States Patent
Huss

(10) Patent No.: US 12,151,507 B2
(45) Date of Patent: Nov. 26, 2024

(54) TAG HOLDING CASSETTE ASSEMBLY FOR USE IN ENGRAVING MACHINES

(71) Applicant: THE HILLMAN GROUP, INC., Cincinnati, OH (US)

(72) Inventor: James F. Huss, Scottsdale, AZ (US)

(73) Assignee: THE HILLMAN GROUP, INC., Forest Park, OH (US)

( * ) Notice: Subject to any disclaimer, the term of this patent is extended or adjusted under 35 U.S.C. 154(b) by 322 days.

(21) Appl. No.: 16/999,110

(22) Filed: Aug. 21, 2020

(65) Prior Publication Data

US 2021/0053385 A1 Feb. 25, 2021

Related U.S. Application Data

(60) Provisional application No. 62/890,679, filed on Aug. 23, 2019.

(51) Int. Cl.
*B44B 3/06* (2006.01)

(52) U.S. Cl.
CPC .................................... *B44B 3/065* (2013.01)

(58) Field of Classification Search
None
See application file for complete search history.

(56) References Cited

U.S. PATENT DOCUMENTS

| | | | | |
|---|---|---|---|---|
| 3,044,198 | A * | 7/1962 | Badalich | G03B 23/04 40/710 |
| 6,321,430 | B1 * | 11/2001 | Goldman | B44B 3/061 29/33 P |
| D626,543 | S | 11/2010 | Pratt | |
| 7,853,353 | B1 | 12/2010 | Dunn | |
| 7,877,909 | B1 | 2/2011 | Junge | |
| 7,894,935 | B1 | 2/2011 | Dunn | |
| 8,050,796 | B1 | 11/2011 | Dunn | |
| 8,413,357 | B1 | 4/2013 | Junge | |
| 8,424,216 | B2 * | 4/2013 | Huss | B44B 3/009 33/18.1 |
| 8,600,546 | B1 | 12/2013 | Dunn | |
| 8,626,338 | B1 | 1/2014 | Dunn | |
| 10,565,486 | B2 * | 2/2020 | Pascua | B32B 29/002 |

OTHER PUBLICATIONS

Admitted prior art, one page.

* cited by examiner

*Primary Examiner* — Alejandro Valencia
(74) *Attorney, Agent, or Firm* — THOMPSON HINE LLP

(57) ABSTRACT

A tag cassette assembly for use in connection with an engraving process carried out in an engraving machine includes a single piece cassette body of plastic material, the cassette body including a first major side and a second major side and a periphery formed by minor edges; a tag secured in a capture space of the cassette body; wherein the cassette first major side is configured to provide access to a first side of the tag to facilitate engraving and the second major side is configured to provide access to a second side of the tag to facilitate engraving.

6 Claims, 33 Drawing Sheets

TAG HOLDING CASSETTE ASSEMBLY FOR USE IN ENGRAVING MACHINES

TECHNICAL FIELD

This application relates generally to engraving of tags, such as pet identification tags, and more particularly, to cassette assemblies for holding tags during the engraving process.

BACKGROUND

Self-service pet tag marking kiosks are known. Such kiosks may be located near a display of pet tag options, where each pet tag is held in a cassette. The cassette holds and displays the tag, and displays information regarding the tag, as well as a scannable purchasing and identification code, such as a bar code. A consumer desiring to engrave a tag selects a pet tag cassette, purchases the cassette at a point-of-sale, and is provided with an access code that enable the consumer to utilize the pet marking kiosk to mark the tag (e.g., with pet name and owner contact information). At the kiosk, the consumer inputs the access code at the kiosk, scans the cassette identification code at the kiosk, inserts the cassette into a kiosk slot and uses a kiosk interface to enter the information to be marked on the tag. The kiosk moves the cassette into a marking position, marks the tag and then outputs the cassette to the consumer. The consumer can then remove the tag from the cassette for attachment to a pet collar.

The cassettes are a consumable item that can be costly for the pet tag manufacturer/seller. One known cassette configuration is shown in FIG. 33 and includes a cassette body formed by a cassette lid 210 and a cassette base 212. A paper insert 214 is provided. The pet tag 216 seats in a recess 218 of the cassette base, and an attachment ring 220 seats in a corresponding recess 222. The paper insert 214 is placed atop the cassette base and the cassette lid 210 is pivotably connected to the base 212 by lid hinge pins 224 that engage in hinge slots 226 of the base. Windows 228, 230 in the lid and base provide machine access to both sides of the tag for marking while the tag is retained in the cassette. The cassette lid 210 may be of clear plastic to enable viewing of information printed on the top side of the paper insert 214, and the cassette base includes an additional window 232 to enable scanning of an identification bar code printed on the bottom side of the paper insert 214. When the cassette lid 10 is closed against the cassette base, retaining structure 234 at the window 228 presses against the tag 216 to help fix and stabilize the tag in the cassette. Other two-piece cassette body configurations that sandwich the pet tag are also known.

It would be desirable to provide a pet tag cassette assembly that is simpler and less expensive.

SUMMARY

In one aspect, a tag cassette assembly for use in connection with an engraving process carried out in an engraving machine, the assembly comprising: a single piece cassette body of plastic material, the cassette body including a first major side and a second major side and a periphery formed by minor edges; a tag secured in a capture space of the cassette body; wherein the cassette first major side is configured to provide access to a first side of the tag to facilitate engraving and the second major side is configured to provide access to a second side of the tag to facilitate engraving.

In another aspect, a tag cassette assembly for use in connection with an engraving process carried out in an engraving machine includes a single piece cassette body of plastic material, the cassette body including a first major side and a second major side and a periphery formed by minor edges. The cassette body forms a capture space for holding a tag and a tag framing panel, wherein the capture space is formed by a lateral slot along one of the minor edges for slidingly receiving the tag and the tag framing panel. Within a periphery of the capture space, the first major side of the cassette body includes both tag engaging structure and tag framing panel engaging structure. Within the periphery of the capture space, the second major side of the cassette body includes both tag engaging structure and tag framing panel engaging structure. The tag engaging structure and tag framing panel engaging structure of the first major side does not align with the tag engaging structure and tag framing panel engaging structure of the second major side.

In a further aspect, a tag cassette assembly for use in connection with an engraving process carried out in an engraving machine includes a cassette body of plastic material, the cassette body including a first major side and a second major side and a periphery formed by minor edges. The cassette body forms a capture space for holding a tag and a tag framing panel, wherein the capture space is formed by a lateral slot along one of the minor edges for slidingly receiving the tag and the tag framing panel. Within a periphery of the capture space, the first major side of the cassette body includes both tag engaging structure and tag framing panel engaging structure. Within the periphery of the capture space, the second major side of the cassette body includes both tag engaging structure and tag framing panel engaging structure.

The details of one or more embodiments are set forth in the accompanying drawings and the description below. Other features, objects, and advantages will be apparent from the description and drawings, and from the claims.

DETAILED DESCRIPTION

Figure 1:
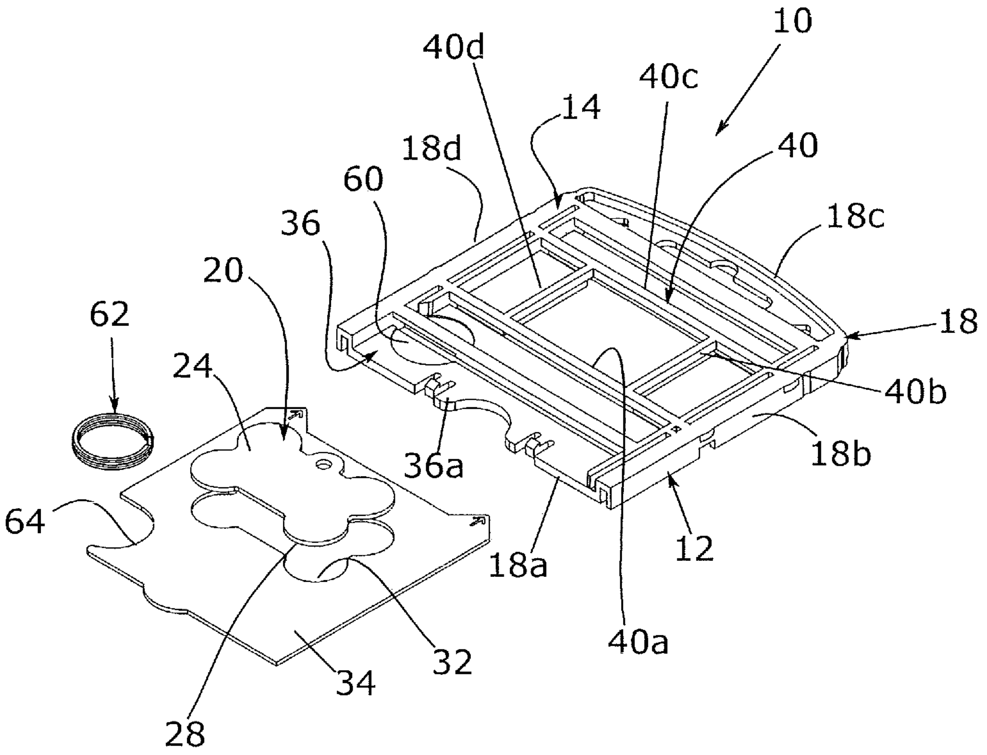
FIGS. 1-7 show one embodiment of a tag cassette assembly.

Referring to FIGS. 1-7, one embodiment of a tag cassette assembly 10 is shown and includes a single piece cassette body 12 (e.g., of a plastic material). The cassette body includes a first major side 14 and a second major side 16 and a periphery 18 formed by minor edges 18*a*-18*d*. A tag 20 is secured in a capture space 22 of the cassette body 12. The cassette first major side 14 is configured to provide access to a first side 24 of the tag 20 (e.g. via opening 26) to facilitate engraving and the second major side 16 is configured to provide access to a second side 28 of the tag (e.g., via opening 30) to facilitate engraving.

The tag 20 is held within an opening 32 of a die cut card 34 (e.g., of paper or paperboard material) or other tag framing panel. The capture space of the single piece cassette body 12 is formed by a lateral slot 36 along the minor edge 18*a* and into which the die cut card 34 slidingly engages (per arrows 38) into a final position (FIG. 3) in order to locate the tag in a set position within the capture space for engraving. In the set position of the tag, the opposite sides 24 and 28 of the tag align with the openings 26 and 30.

The first major side 14 of the cassette body 12 includes tag engaging structure 40 (e.g., beams 40*a*-40*d*) along at least a portion of a periphery the tag 20 when the tag is in the set position, and the second major side 16 of the cassette body 12 includes tag engaging structure 42 (e.g., walls 42*a*-42*b*) along at least a portion of the periphery of the tag when the tag is in the set position. This structure retains the tag in the z-direction for the purpose of keeping the tag stationary during engraving.

An internal end 36*c* of the lateral slot 36 includes a card stop edge with one or more card alignment features 44, and the die cut card includes corresponding card alignment features 46 that engage into the card alignment features 44 when the die cut card is in the final position. Here, the card alignment features 44 are female and triangular in shape with adjoining angled sides 46, 48, and the card alignment features 46 are male and triangular in shape with adjoining angled sides 50, 52 that mate by engagement with the adjoining angled sides of the card alignment features 44. An entry end 36*a* of the lateral slot includes at least one or more retaining tabs 54 that include tapered entry surfaces 56 to facilitate insertion of the card. The inwardly facing edges of the tabs define card edge stops. The opposed sides 36*b* and 36*c* of the lateral slot are have card edge contacting surfaces. The combination of the tabs and card stop edges of the slot holds the die cut card in place in the x and y directions, and the card 34 in turn holds the tag 20 in place in x and y directions for keeping the tag 20 stationary during engraving.

Figure 8:
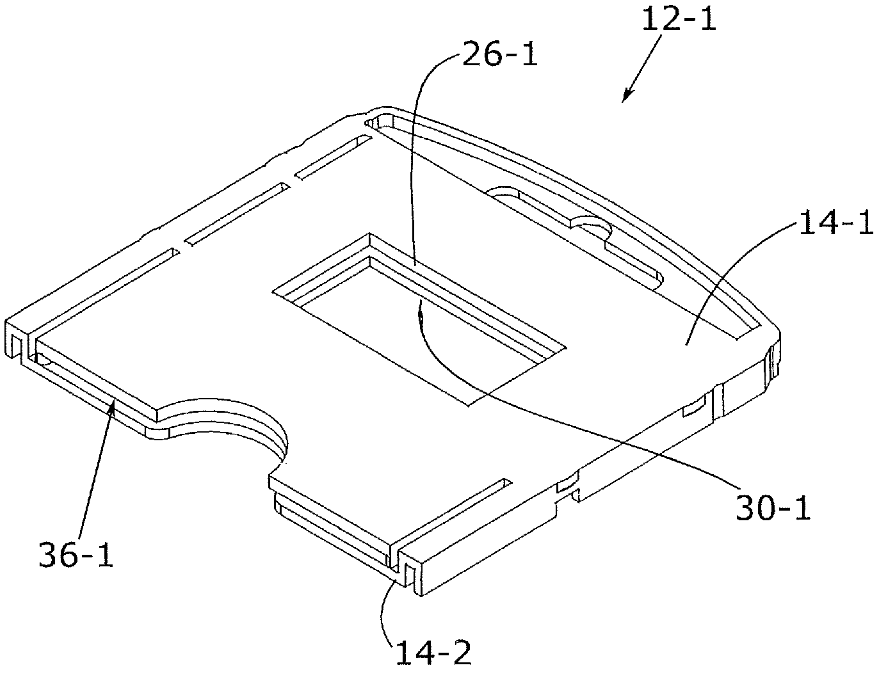
FIGS. 8-9 show another embodiment of a cassette body.
Figure 9:
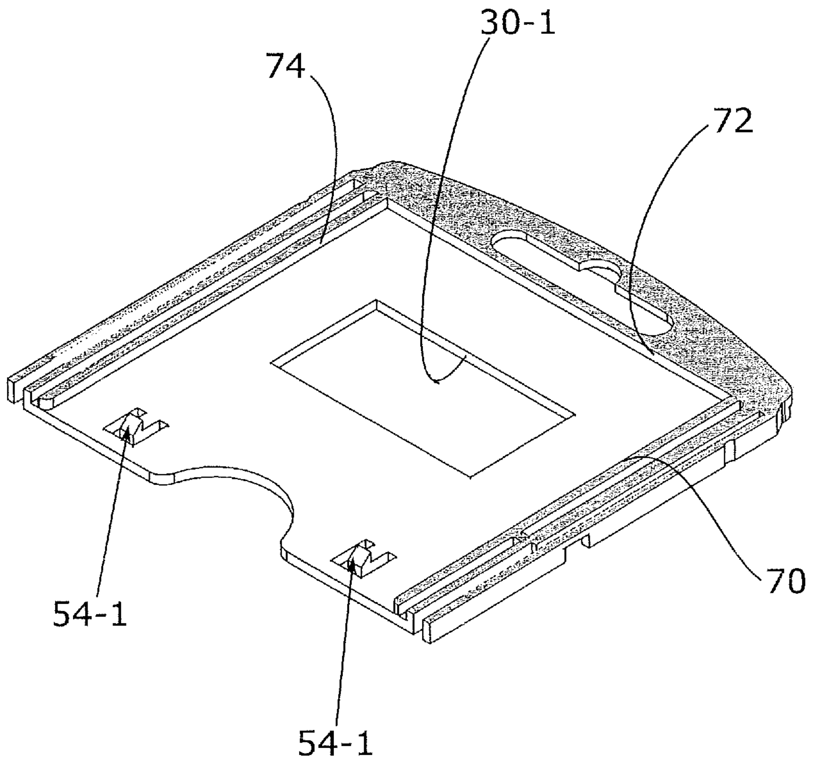
Figure 10:
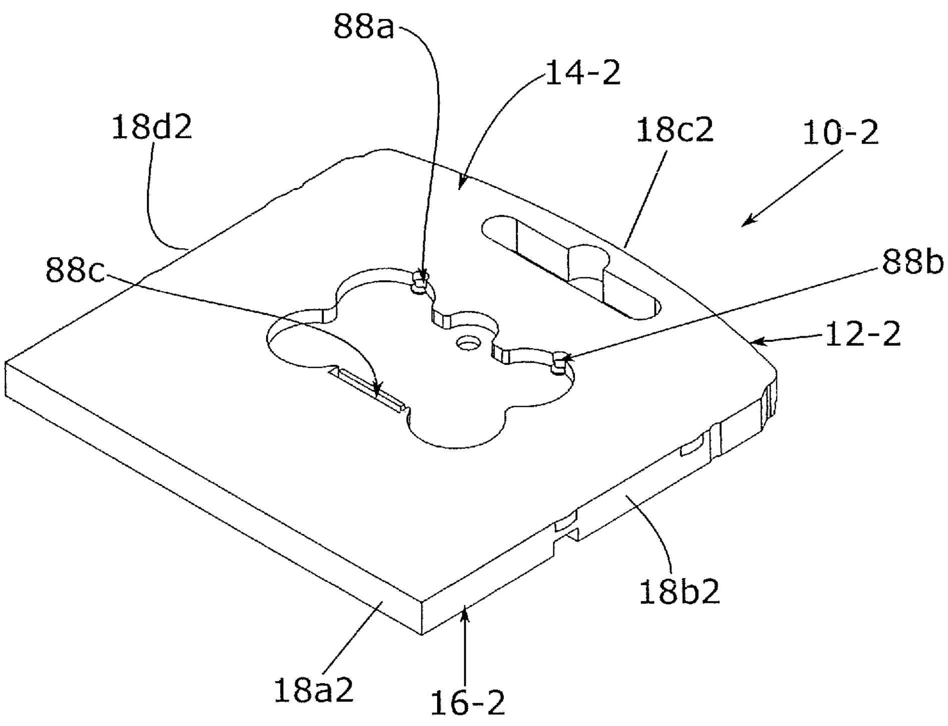
FIGS. 10-16 show another embodiment of a tag cassette assembly.
Figure 11:
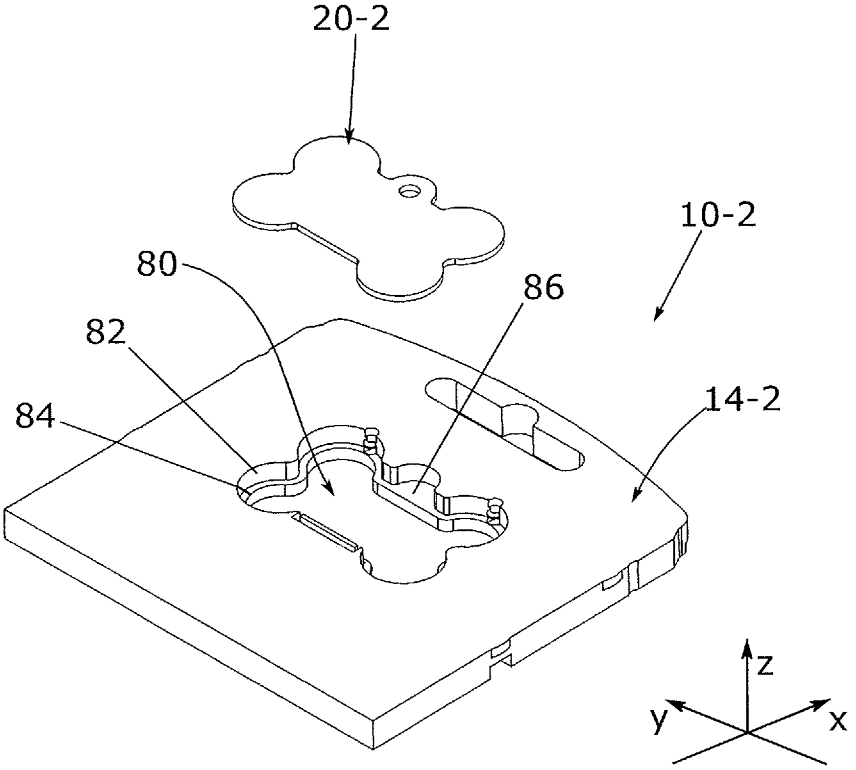
Figure 12:
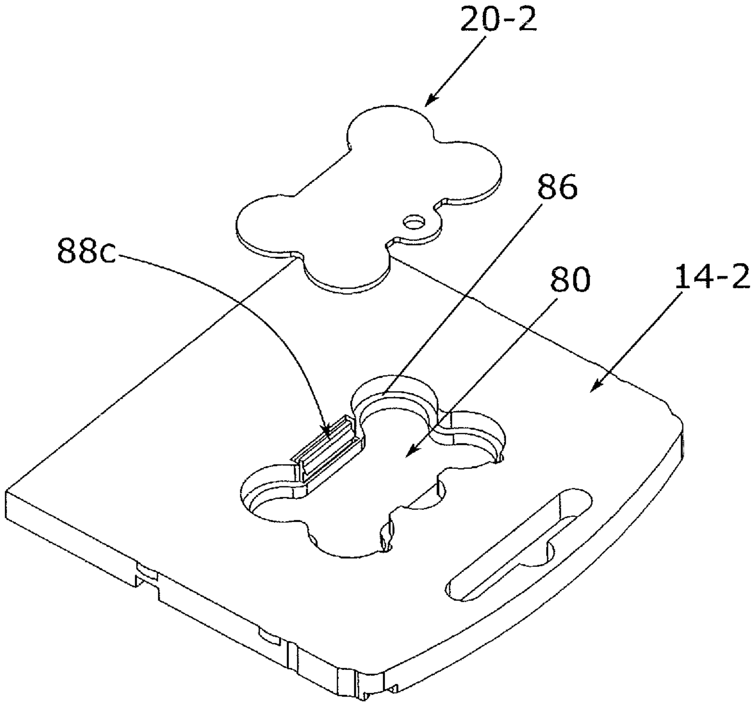
Figure 13:
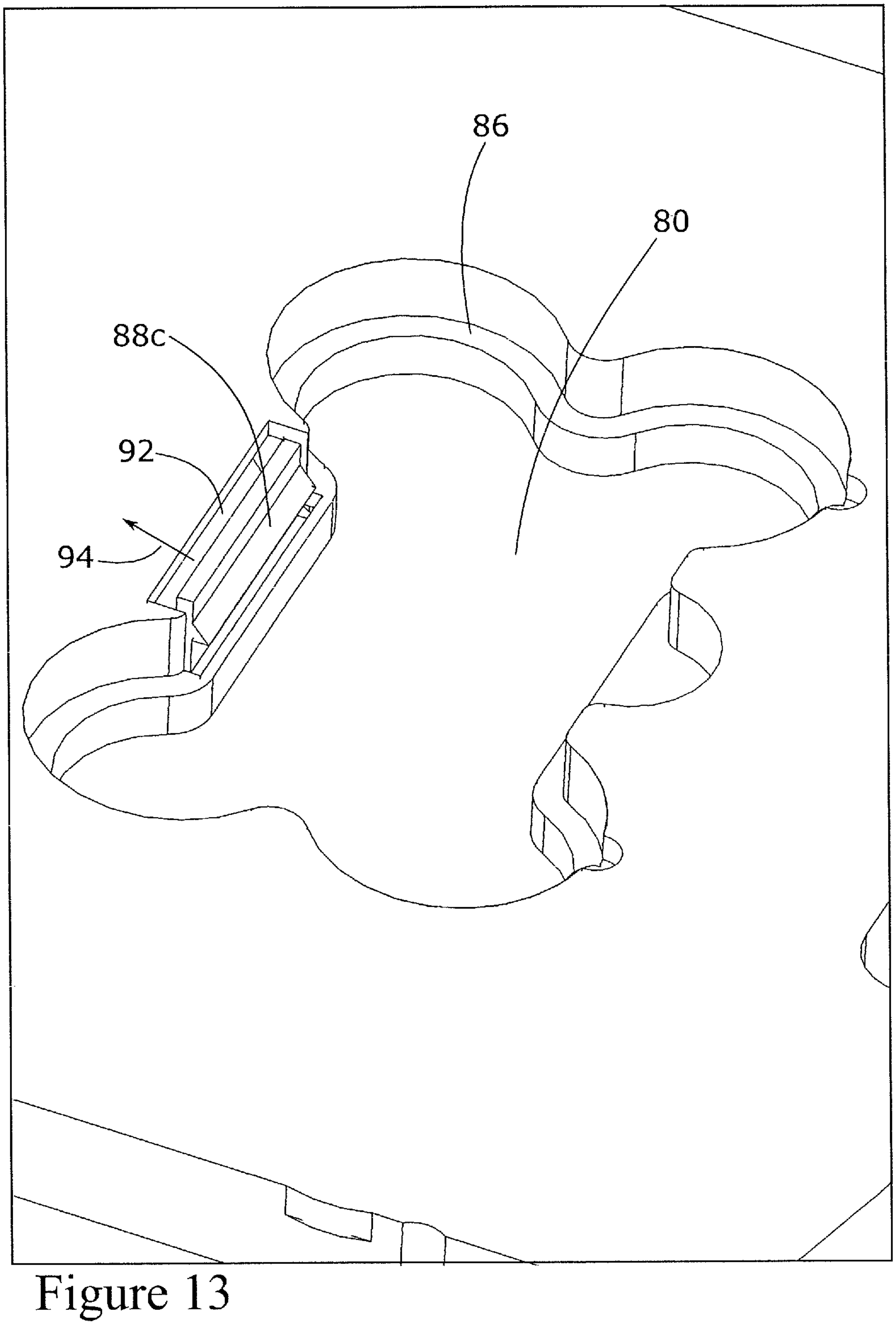
Figure 14:
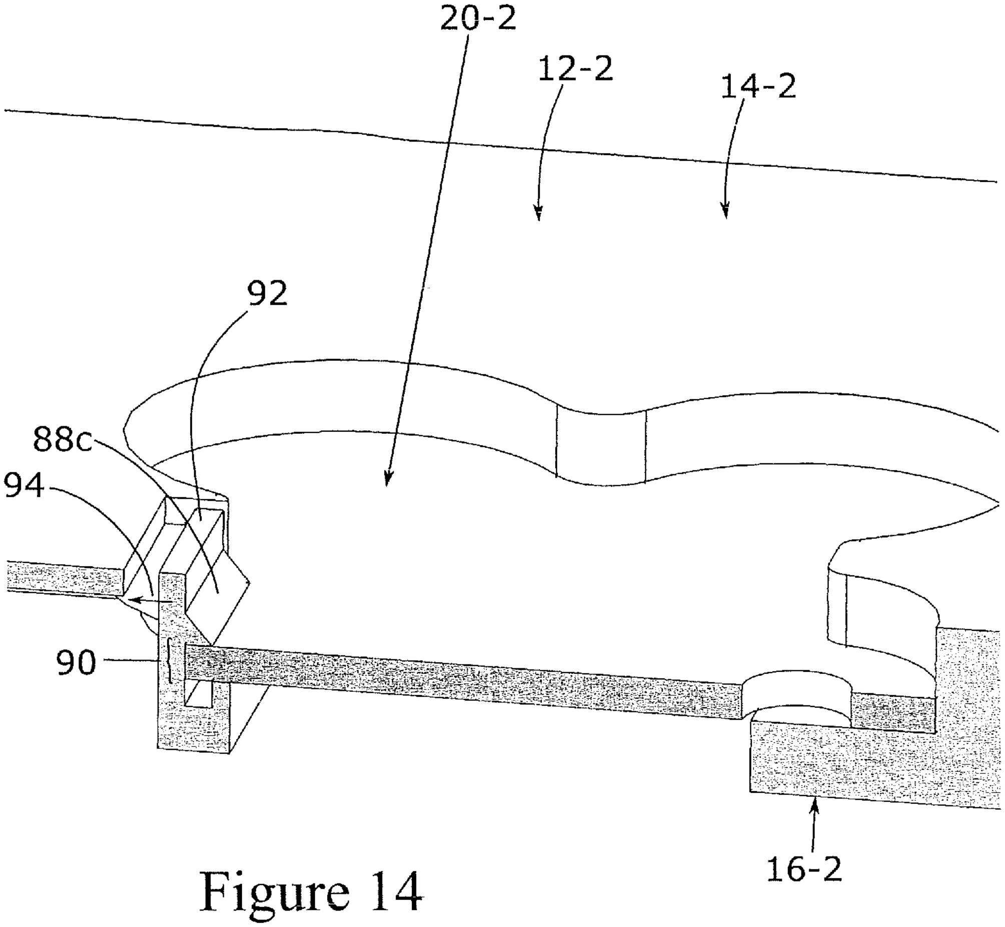
Figure 15:
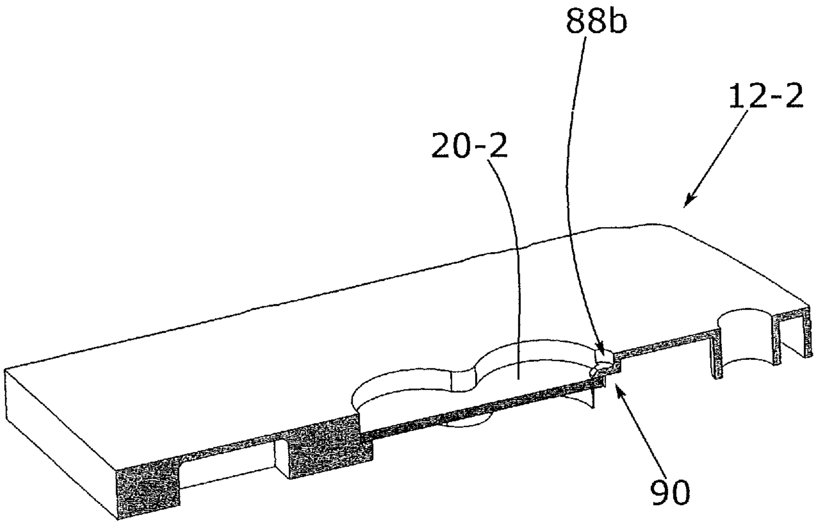
Figure 16:
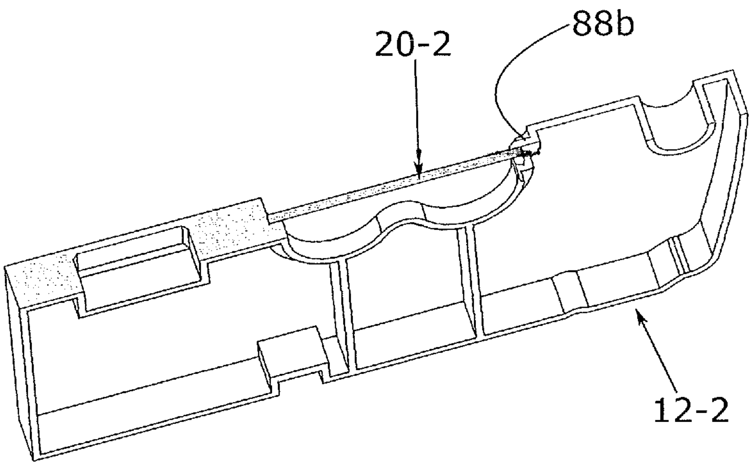
Figure 17:
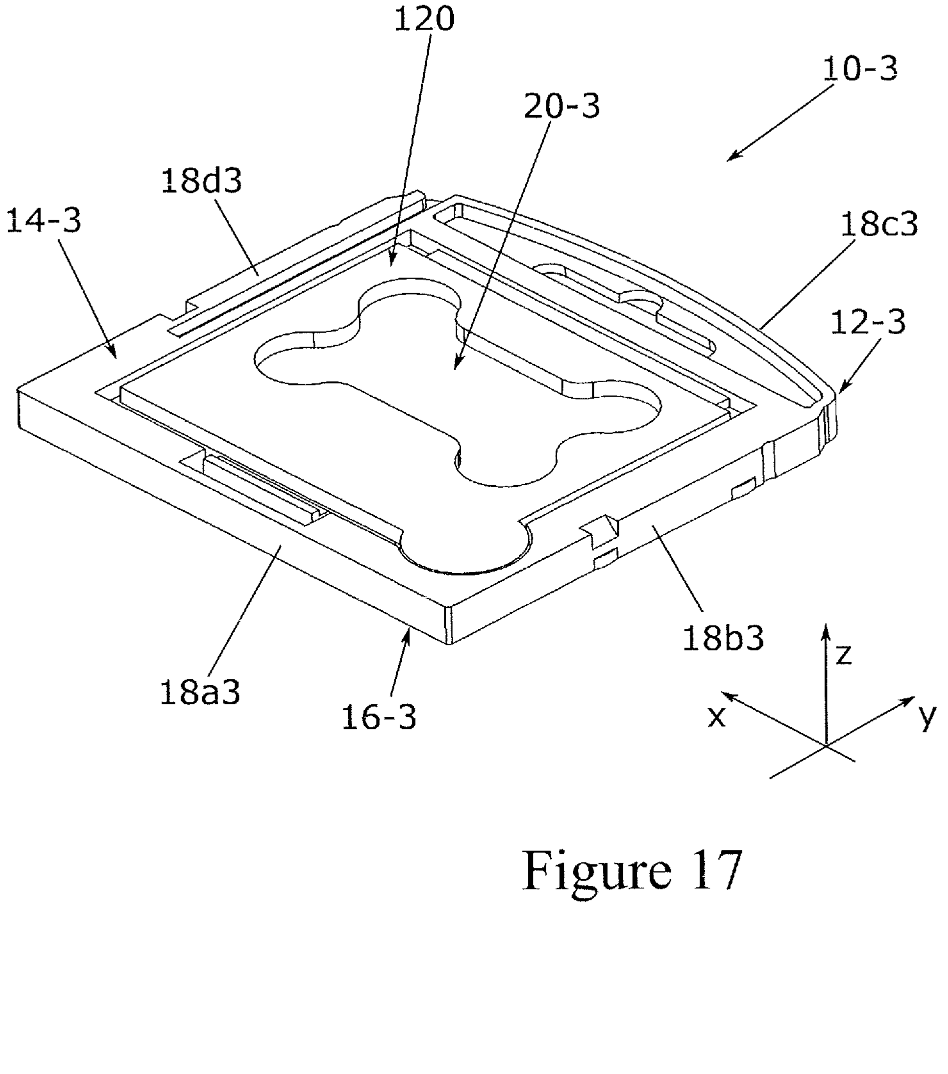
FIGS. 17-21 show another embodiment of a tag cassette assembly.
Figure 18:
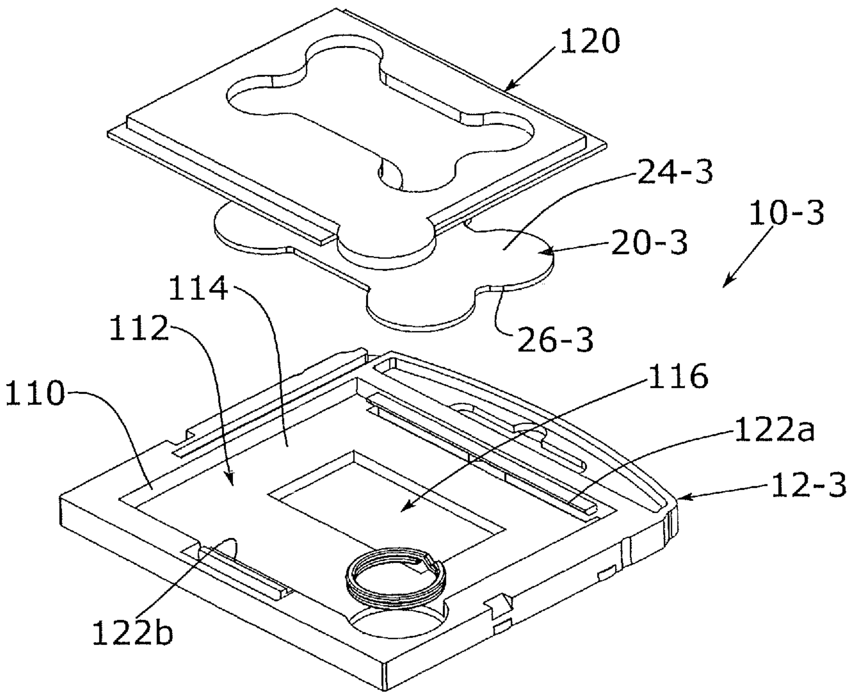
Figure 19:
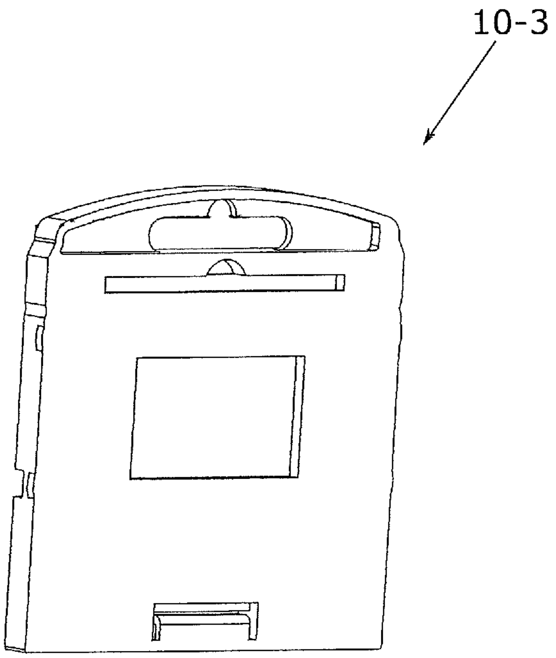
Figure 20:
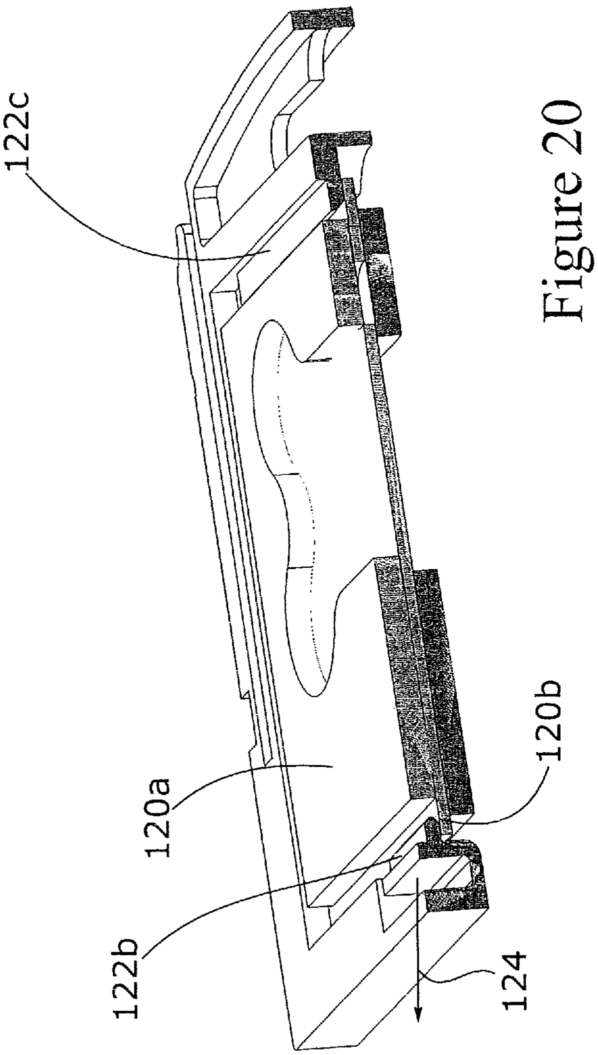
Figure 21:
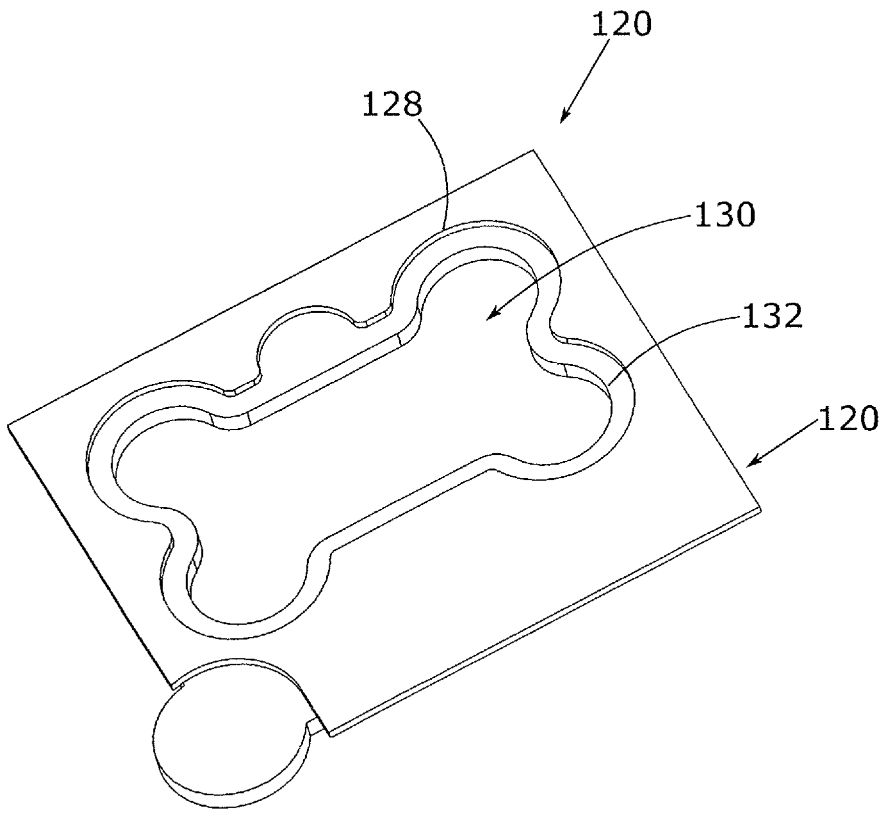

As shown, the cassette body 12 may also include a recess 60 for receiving an attachment ring 62, with the card 34 having a cutout 64 for x and y retention of the attachment ring 62. The cassette body may be of a clear plastic material through which indicia on a surface of the die cut card 34 can be viewed. Here, major side 14 of the body 12 is of a skeletal type configuration, such as may be formed by a mold with a two direction pull. However, using a more complex mold, such as a mold with a slide, both major sides can be formed with more complete continuity, as suggested by the embodiment of the cassette body 12-1 shown in FIGS. 8 and 9, where opposed major sides 14-1 and 14-2, with respective openings 26-1 and 30-1, enable capture of a die cut card and tag (not shown) within a lateral slot 36-1. Card retaining edges 70, 72, 74 and card retaining tabs 54-1 are also provided.

Figure 2:
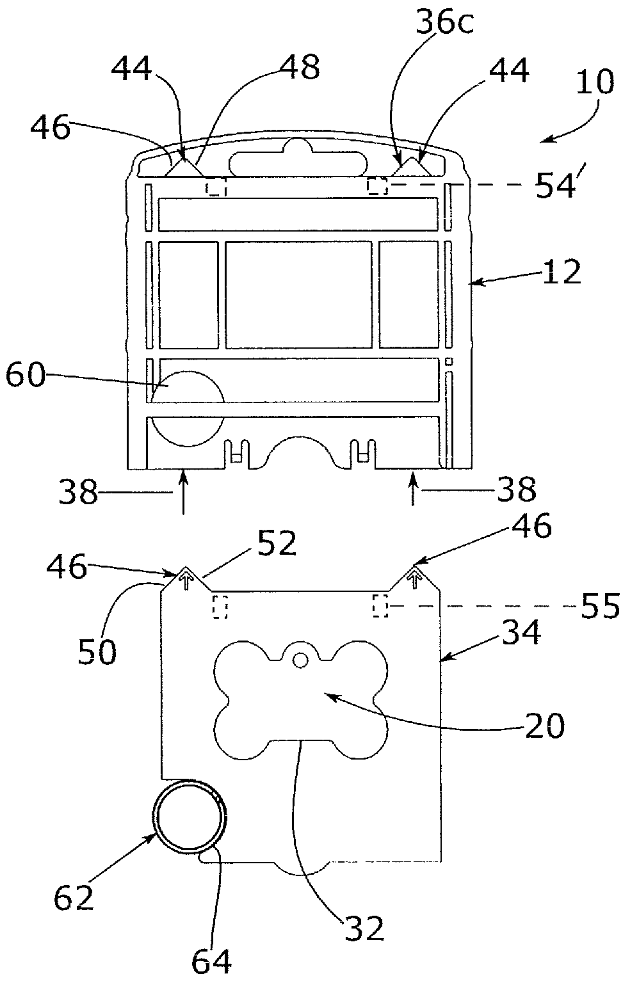
Figure 3:
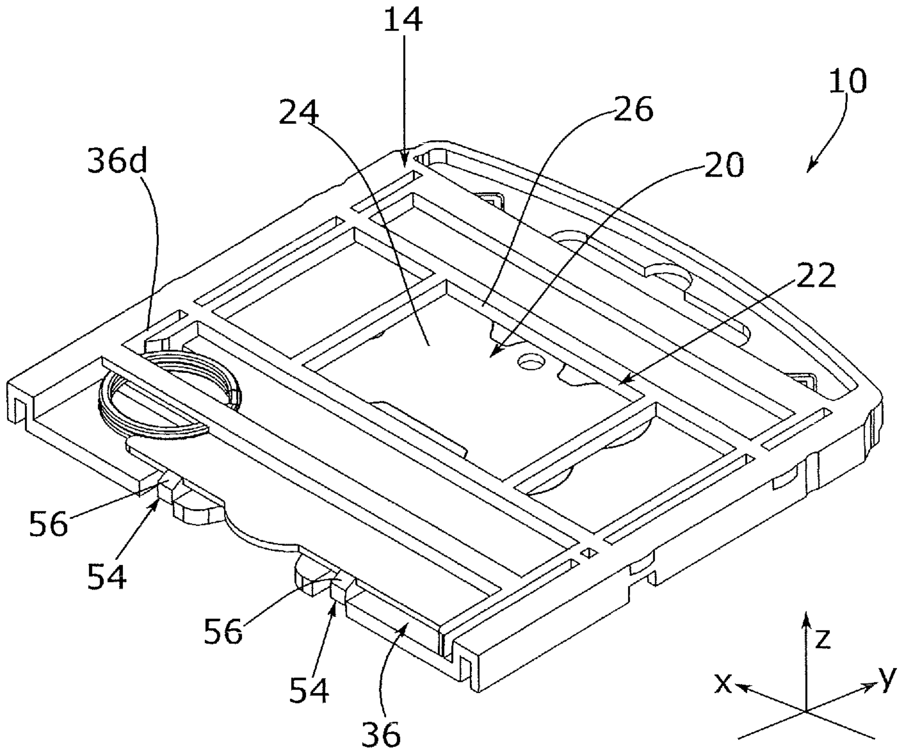
Figure 4:
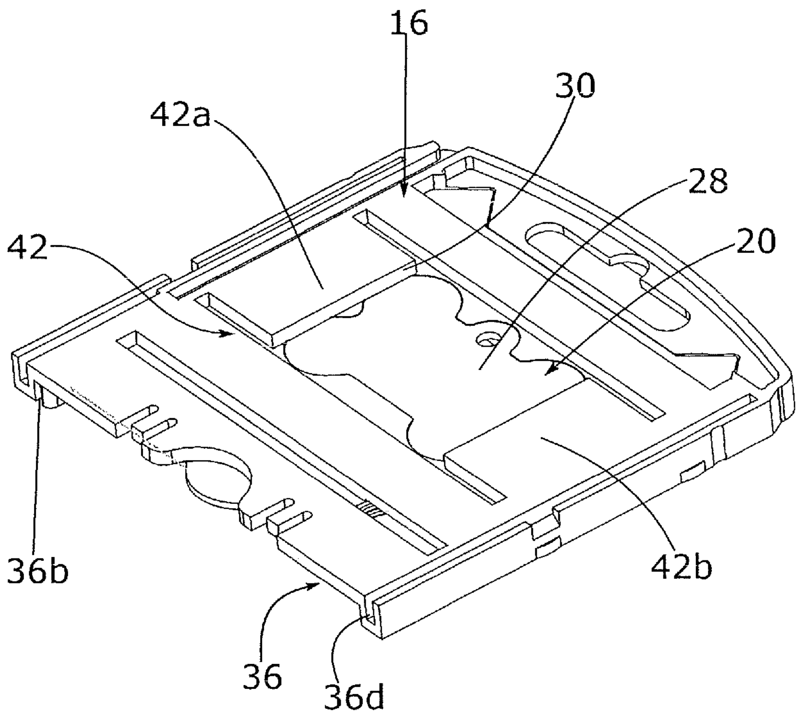
Figure 5:
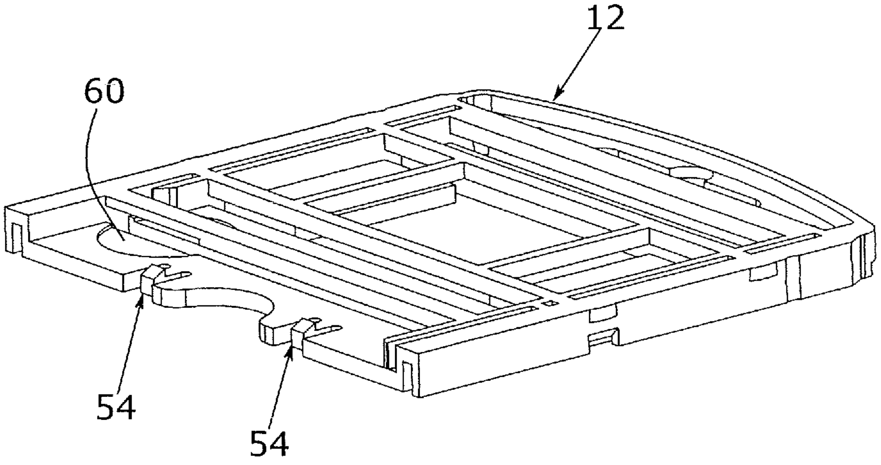
Figure 6:
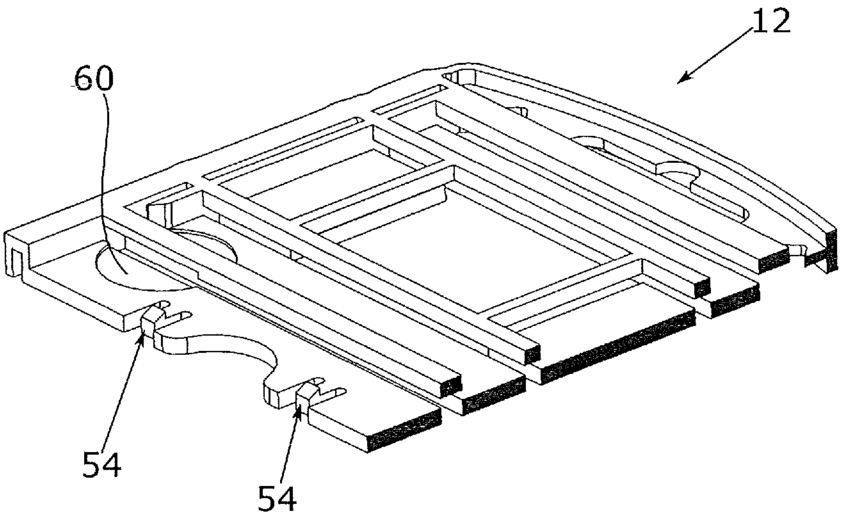
Figure 7:
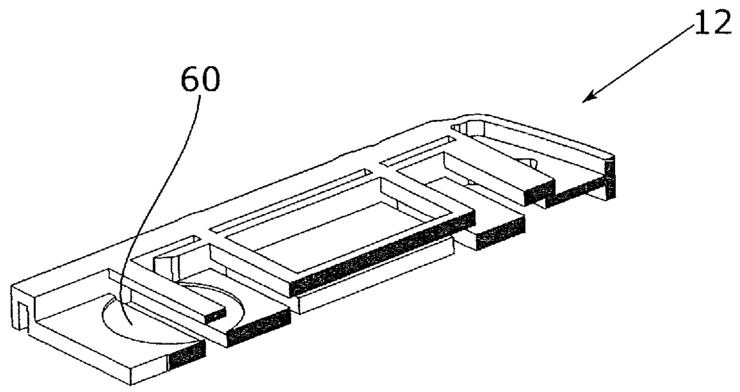

In variations of either the cassette assembly 10 or the cassette assembly 10-1, the retaining tabs 54, 54-1 could be moved away from the entry end and toward the internal end of the lateral slot (e.g., into position 54' as seen in FIG. 2) for engagement with slots exemplary slots 55 located on the die cut card. Such an arrangement would place the capturing/retaining feature near the leading edge of the card, so there is no resistance to card insertion in the lateral slot until the card is almost fully seated. In such cases, removal of the card could possibly involve tearing the card at the slots 55.

Another embodiment of a tag cassette assembly 10-2 is shown in FIGS. 10-16 and includes a cassette body 12-2 with opposed major sides 14-2 and 16-2 and minor edges 18*a*2-18*d*2. The cassette body 12-2 includes a through opening 80 comprised by a recess 82 into the major side 14-2, with a bottom 84 of the recess defined by an inwardly extending rim 86 of the major side 16-2, where the inwardly extending rim 86 defines a periphery of the through opening 80 at the major side 16-2. The recess 82 includes a plurality of retention tabs 88*a*, 88*b*, 88*c* positioned relative to the inwardly extending rim 86 so as to form a retention gap 90 therebetween that at least in part defines the capture space for the tag 20-2. Peripheral portions of one side 26-2 of the tag seat against the inwardly extending rim 86 and peripheral portions of the other side 24-2 of the tag are engaged by the plurality of tabs. At least one of the tabs 88*c* is configured to be able to flex outwardly (e.g. wall 92 can flex outward per arrow 94) for insertion of the tag into the recess.

In the tag cassette assembly 10-2, retention of the tag 20-2 in the z-direction is provided by the rim 86 and tabs 88*a*-88*c*, and retention of tag 20-2 in the x and y directions is provided by the periphery of the recess 82.

The cassette body 12-2 may be of a clear plastic material with an adhesive decal applied to the major side 14-2. Alternatively, the cassette body may be of a plastic (e.g., PET) that is direct surface printed on the major side 14-2 and/or the major side 16-2.

Another embodiment of a tag cassette assembly 10-3 is shown in FIGS. 17-20 and includes a cassette body 12-3 with opposed major sides 14-3 and 16-3 and minor edges 18*a*3-18*d*3. The cassette body includes a recess 110 into the major side 14-3, where a bottom 112 of the recess is defined by a wall 114 of the major side 16-3. The wall 114 includes a through opening 116, and the tag 20-3 is positioned in the recess 110 with one side 26-3 at least partially aligned with the through opening 116. A laminated die cut card 120 is also seated in the recess 110, over the tag 20-3 to retain the tag in the recess. The recess 110 includes peripheral retention tabs 122*a*, 122*b* and edge portions of the laminated die cut card 120 are positioned beneath the retention tabs 122*a*, 122*b* to hold the laminated die cut card 120, and thus the tag 20-3, within the recess. At least one of the retention tabs 122*b* is configured to be able to flex outwardly (per arrow 124) for insertion of the laminated die cut card 120 into the recess. The laminated die cut card 120 includes a seating recess 128 for the tag 20-3, and a through opening 130 defined by a seating rim 132 of the recess 128. The seating recess 128 is formed by the relative shape and size of the openings in the laminated card sheet parts 120*a* and 120*b*. The car sheet parts 120*a* may be held to each other by adhesive, stitching or material weld. Card sheet part 120*a* may be of clear plastic.

In the tag cassette assembly 10-3, retention of the tag 20-3 in the z-direction is provided by the wall 114 and the seating rim 132 of the card 120, and retention of tag 20-3 in the x and y directions is provided by the periphery of the recess 128.

Referring to FIGS. 26-31, another embodiment of a tag cassette assembly 10-6 is shown and includes a single piece cassette body 12-6 (e.g., of a plastic material). The cassette body includes a first major side 14-6 and a second major side 16-6 and a periphery 18-6 formed by minor edges 18-6*a* through 18-6*d*. A tag 20-6 is secured in a capture space 22-6 of the cassette body 12-6. The cassette first major side 14-6 is configured to provide access to a first side face 24-6 of the tag 20-6 (e.g. via opening 26-6) to facilitate engraving and the second major side 16-6 is configured to provide access to a second side face 28-6 of the tag (e.g., via opening 30-6) to facilitate engraving.

The tag 20-6 is held within an opening 32-6 of a die cut card 34-6 (e.g., of paper or paperboard material) or other tag framing panel. The capture space of the single piece cassette body 12-6 is formed by a lateral slot 36-6 along the minor edge **18-6*a* and into which the die cut card 34-6 slidingly engages (per arrows 38-6) into a final position (FIG. 27) in order to locate the tag in a set position within the capture space for engraving. In the set position of the tag, the opposite side faces 24-6 and 28-6 of the tag align with the openings 26-6 and 30-6**.

The first major side 14-6 of the cassette body 12-6 includes tag engaging structure 40-6 (e.g., beams **40-6*a* through 40-6*d*) along at least a portion of a periphery the tag 20-6 when the tag is in the set position, and the second major side 16-6 of the cassette body 12-6 includes tag engaging structure 42-6 (e.g., wall portions 42-6*a* through 42-6*b*) along at least a portion of the periphery of the tag when the tag is in the set position. This structure retains the tag in the z-direction for the purpose of keeping the tag stationary during engraving. Each of the first major side 14-6 and the second major side 16-6 also includes respective tag framing panel engaging structure 43-6 or 45-6**. Notably, in the illustrated embodiment, the tag engaging structure and tag framing panel engaging structure of the first major side does not align (in plan view perpendicular to the plane of either of the major sides) with the tag engaging structure and tag framing panel engaging structure of the second major side. The configuration of the tag engaging structure can vary depending upon the shape and size of the tag to be held by the cassette body.

An internal end **36-6*c* of the lateral slot 36-6 includes a card stop edge for engaging with a leading side edge 47-6 of the tag framing panel, when the tag framing panel is in the final position. An entry end 36-6*a* of the lateral slot includes one or more retaining tabs 54-6 that include tapered entry surfaces 56-6 to facilitate insertion of the card. The inwardly facing edges of the tabs define card edge stops. Here, the tabs 54-6 are in fixed, non-moving positions on part of the tag framing panel engaging structure of the second major side 16-6**.

The opposed sides **36-6*b* and 36-6*d* of the lateral slot have panel edge contacting surfaces. The combination of the tabs and panel stop edges of the slot holds the panel in place in the x and y directions, and the panel 34-6 in turn holds the tag 20-6 in place in x and y directions for keeping the tag 20-6 stationary during engraving. Here, the panel 34-6 includes opposed side edges each having one or more projecting edge features 49** (here curved bump-outs) for positively engaging with panel edge contacting surfaces of the lateral slot.

Figure 32:
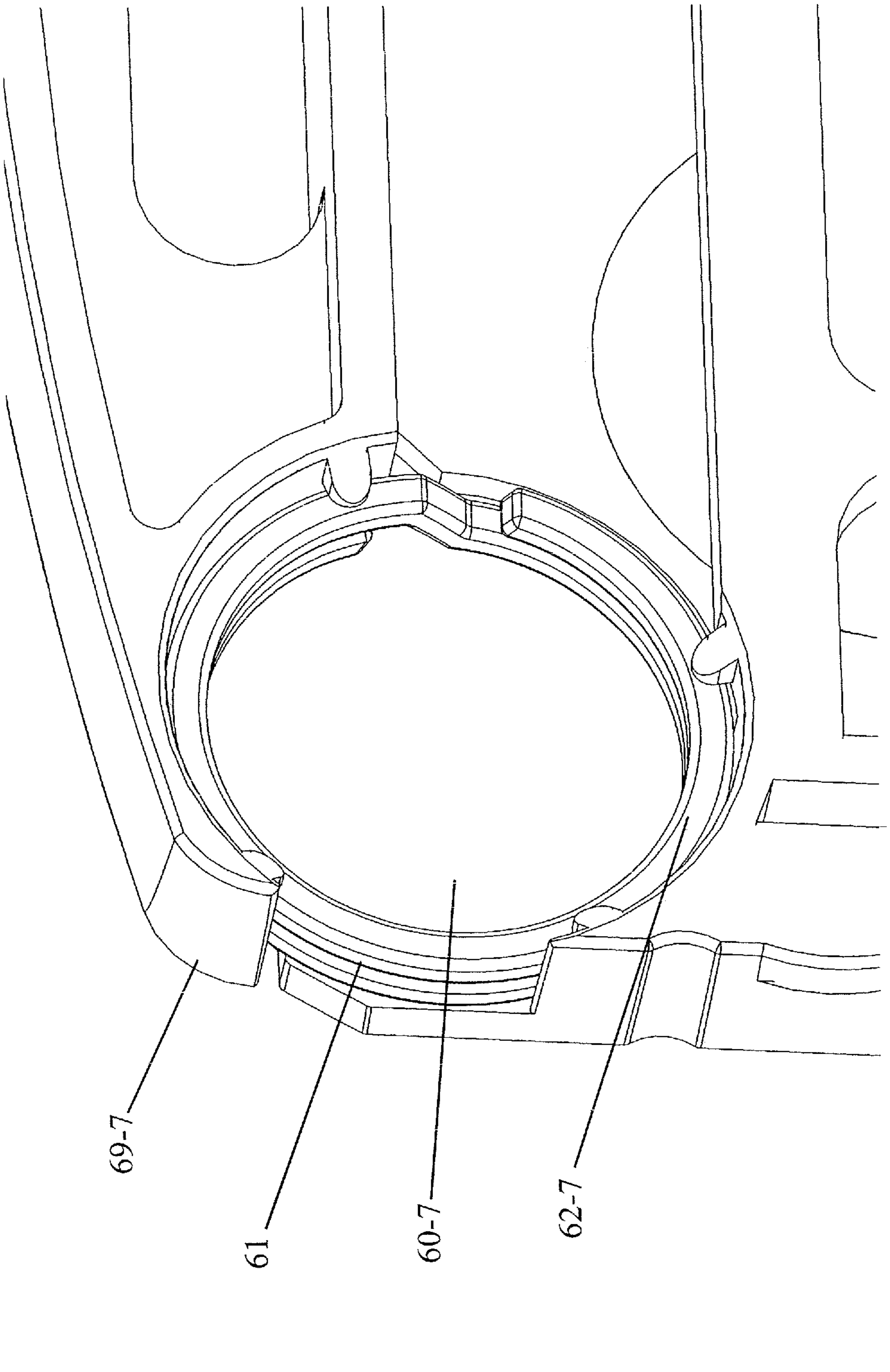
FIG. 32 shows another attachment ring recess configuration.
Figure 33:
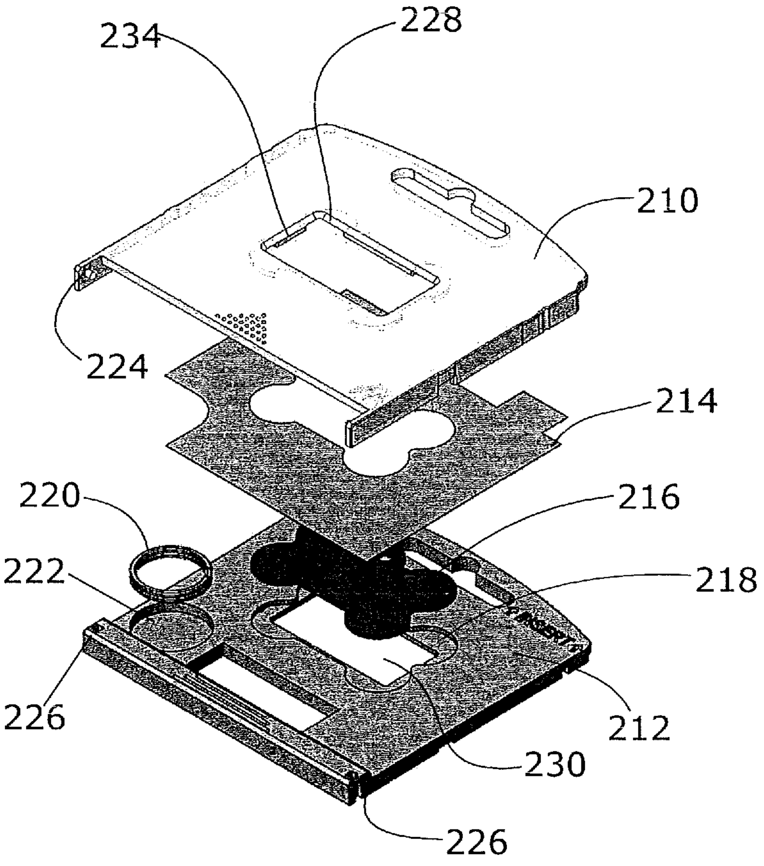
Figure 33 (Prior Art)
FIG. 33 shows a prior art cassette assembly.

As shown, the cassette body 12-6 also include a recess 60-6 for receiving an attachment ring 62-6. Here, the recess 60-6 in which the attachment ring is held is offset from the capture space 22-6. The recess 60-6 includes a bottom portion 63-6 defined by the second major side, and multiple ring retaining tabs 65-6 at the first major side for securing the attachment ring within the recess and against the bottom 63-6. A periphery of the recess 60-6 is defined at least in part by a removable finger 69-6 that is configured to be manually broken away from the cassette body. Here, a slot 71-6 is provided to define a free end **69-6*a* of the finger that is graspable by a user. The finger includes runs along a slot that helps define the finger the slot includes a slot end, at which point the finger typically breaks away from the cassette body when pulled by a user. Here, one or more of the ring retaining tabs 65-6 are located on the removable finger, so that once the finger is broken away, the attachment ring 62-6 can be manually pulled from the recess 60-6. In an alternative embodiment, per FIG. 32, some or all of the finger may be eliminated along the ring recess 60-7. In such case, one side of the recess at the periphery of the cassette body may be open, such that the attachment ring recess includes an unbounded side portion along a portion of a peripheral edge of the cassette body. The inserted attachment-ring 62-7 then includes a peripheral portion 61 that is exposed for enabling a person to grasp and remove the ring 62-7, in some cases without requiring breaking away of any finger or, here small finger part 69-7**.

The cassette body may be of a clear plastic material through which indicia (e.g., graphics and/or bar code) on a surface of the tag framing panel 34-6 can be viewed. A bar code printed on the framing panel may also be aligned with one of the open, uncovered spaces at the major side 14-6, so as to be readily scannable by a scanner in an engraving machine and/or other point-of-sale. Here, major side **14-6*a* of the body 12-6** is of a skeletal type configuration, such as may be formed by a mold with a two direction pull. However, using a more complex mold, such as a mold with a slide, both major sides can be formed with more complete continuity.

Figure 22:
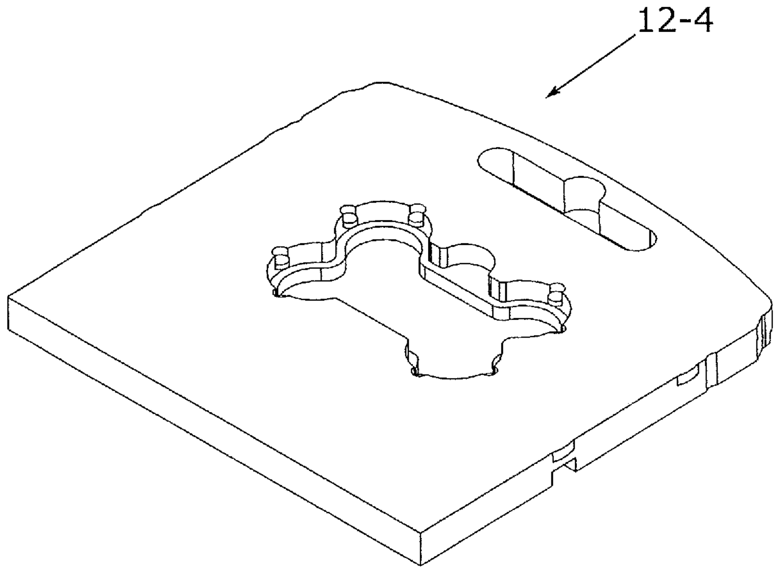
FIGS. 22-23 show another embodiment of a cassette body.
Figure 23:
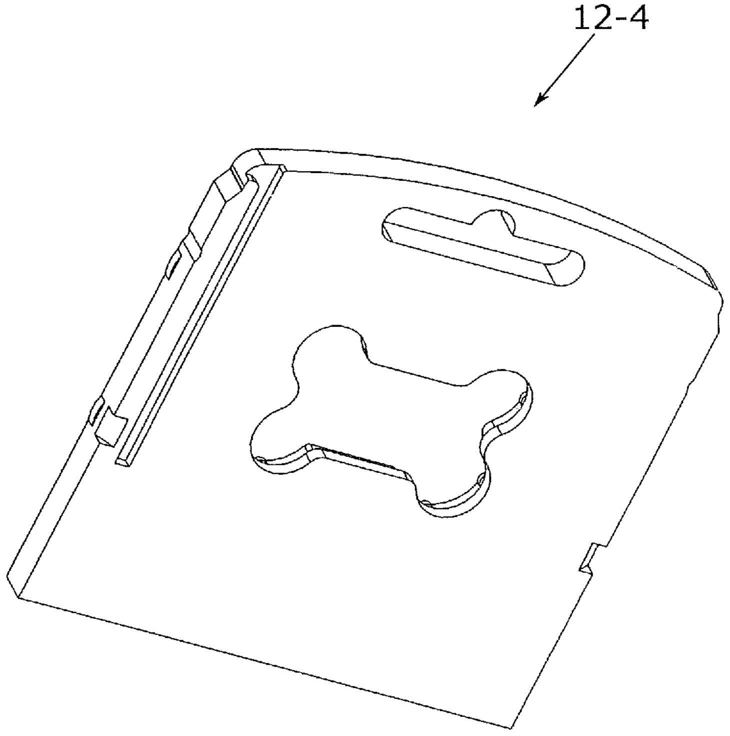
Figure 24:
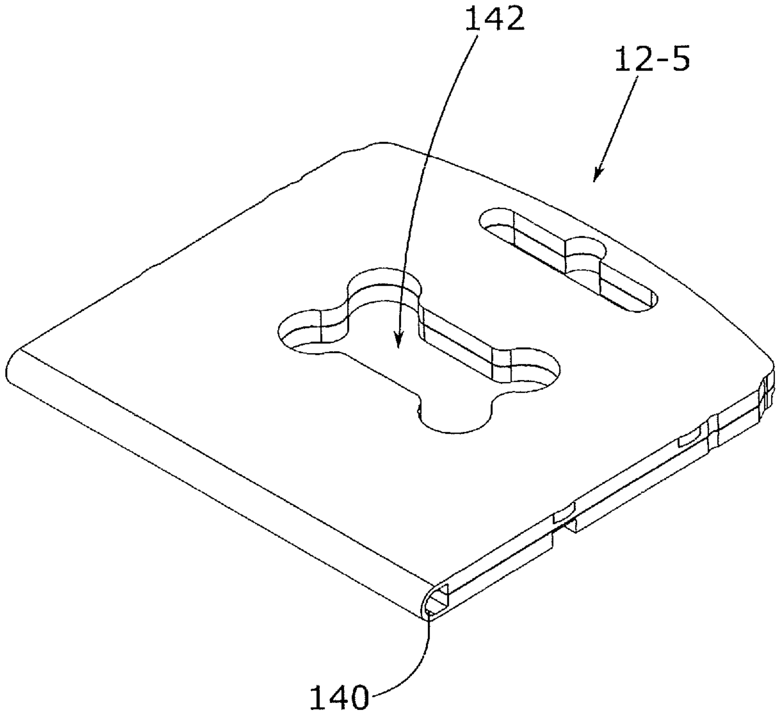
FIGS. 24-25 show another embodiment of a cassette body.
Figure 25:
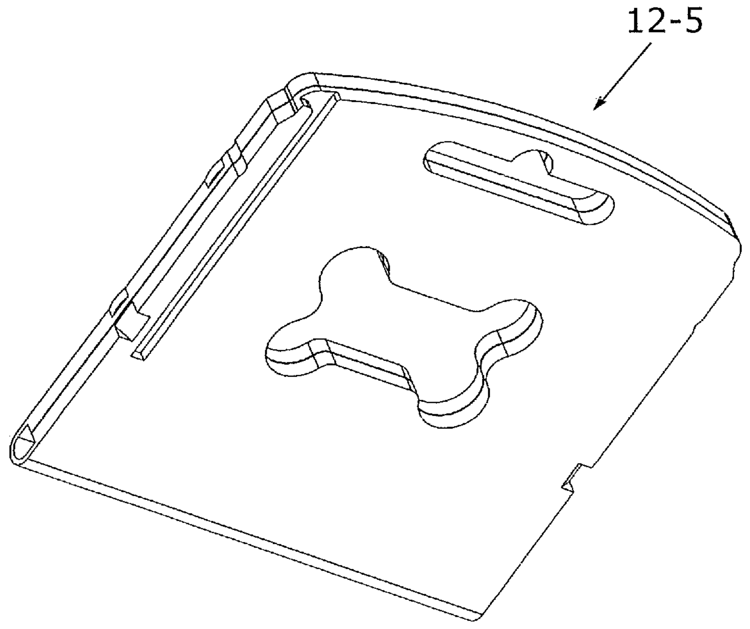
Figure 26:
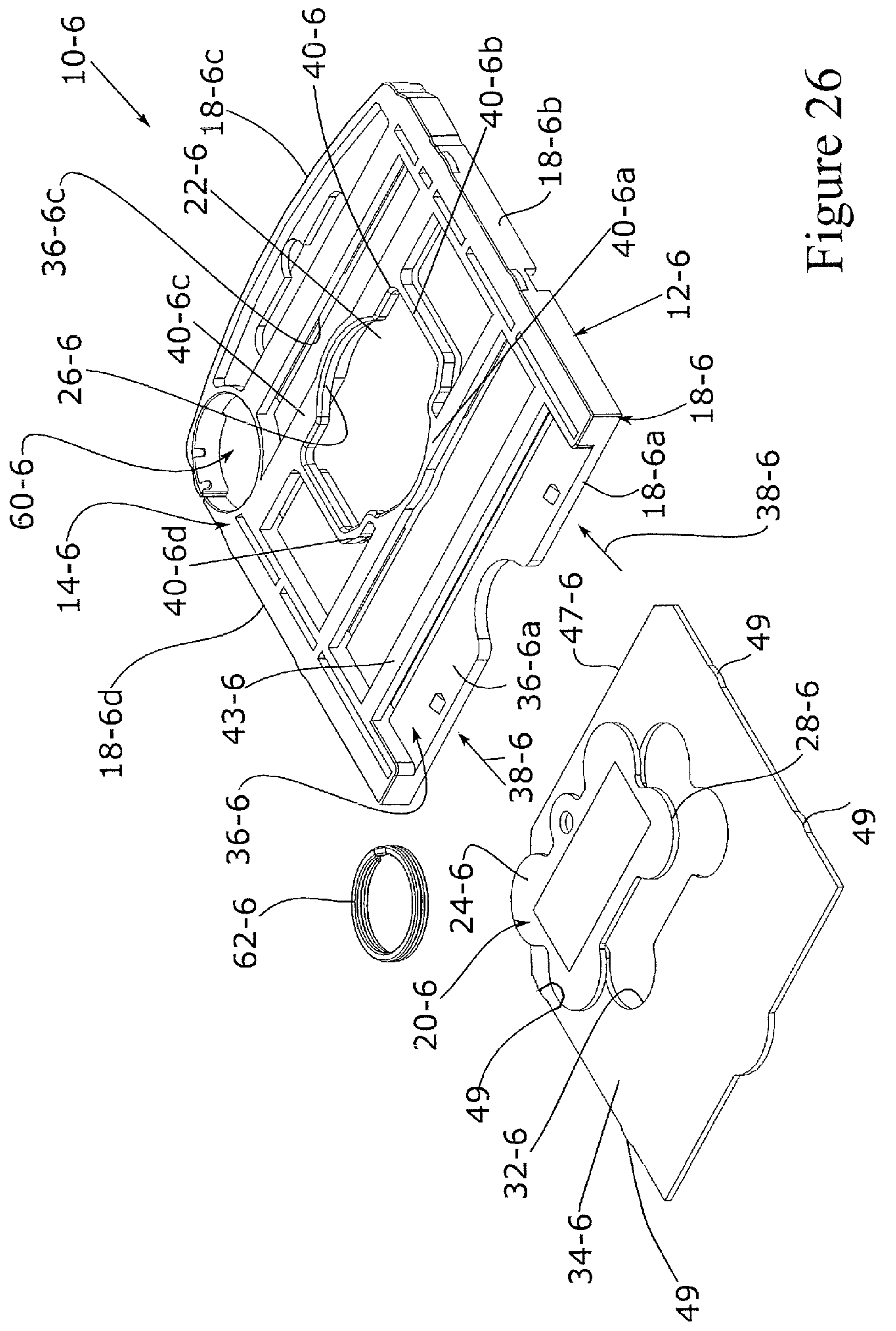
FIGS. 26-31 show another embodiment of a tag cassette assembly.
Figure 27:
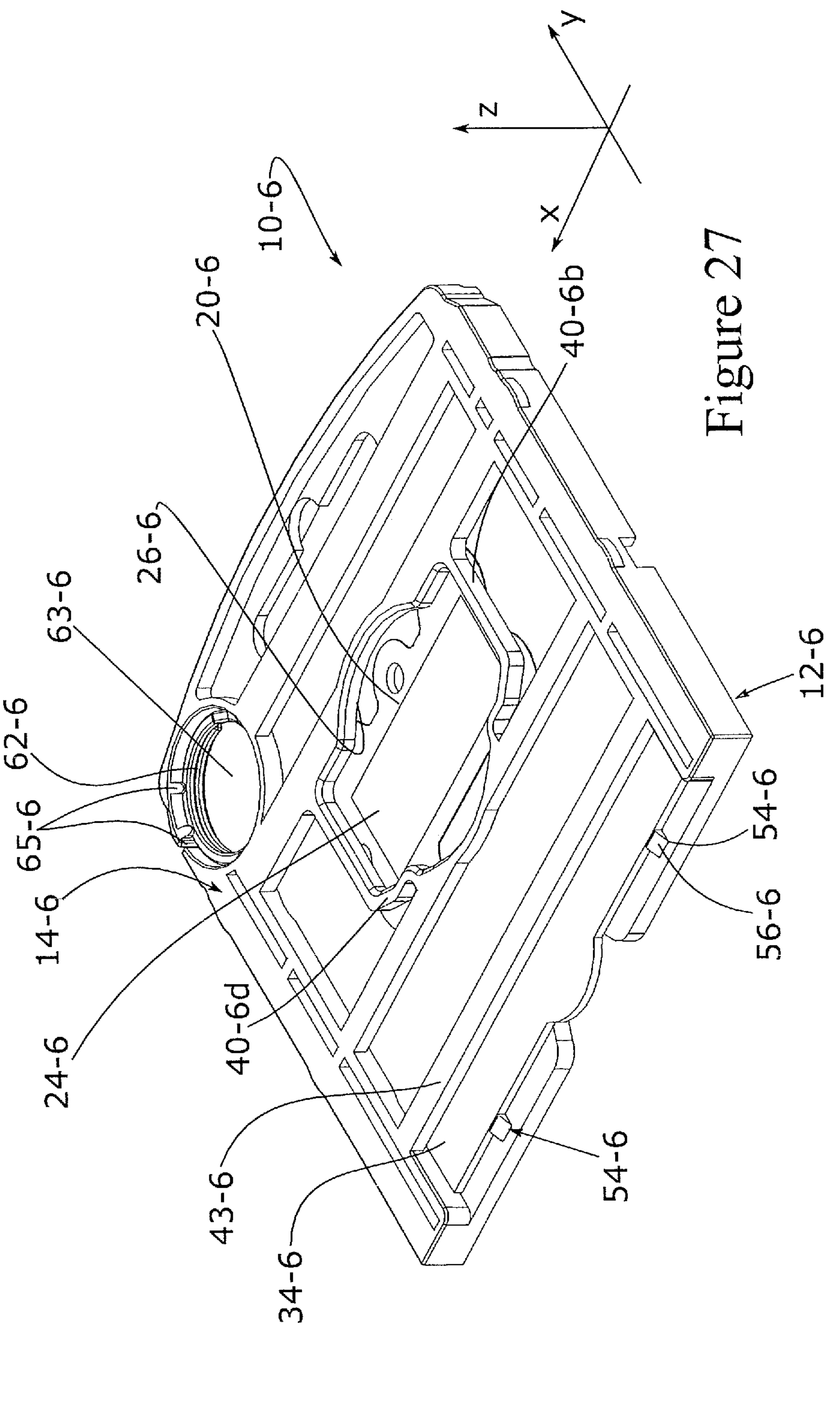
Figure 28:
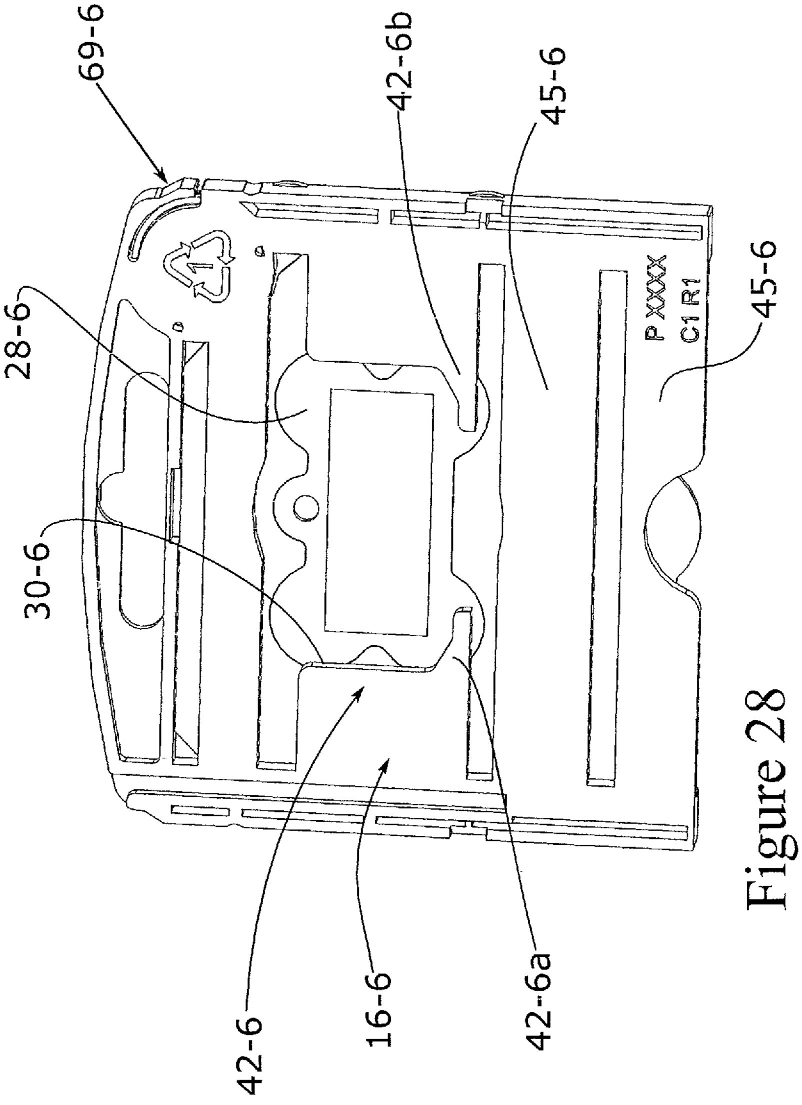
Figure 29:
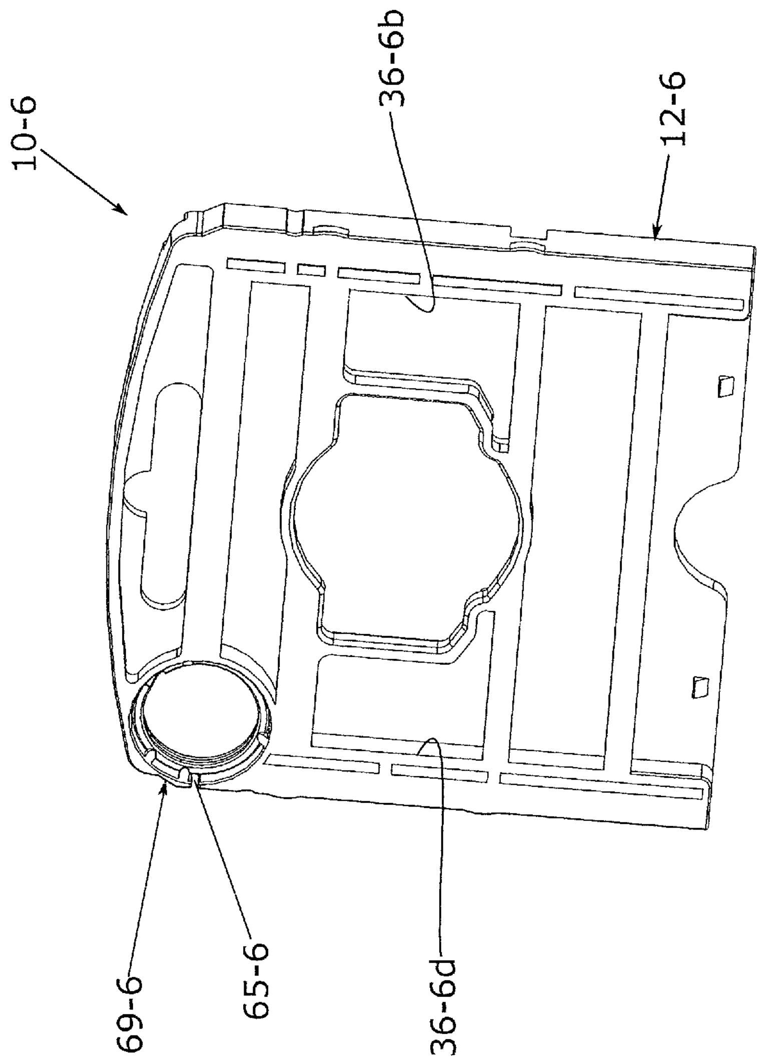
Figure 30:
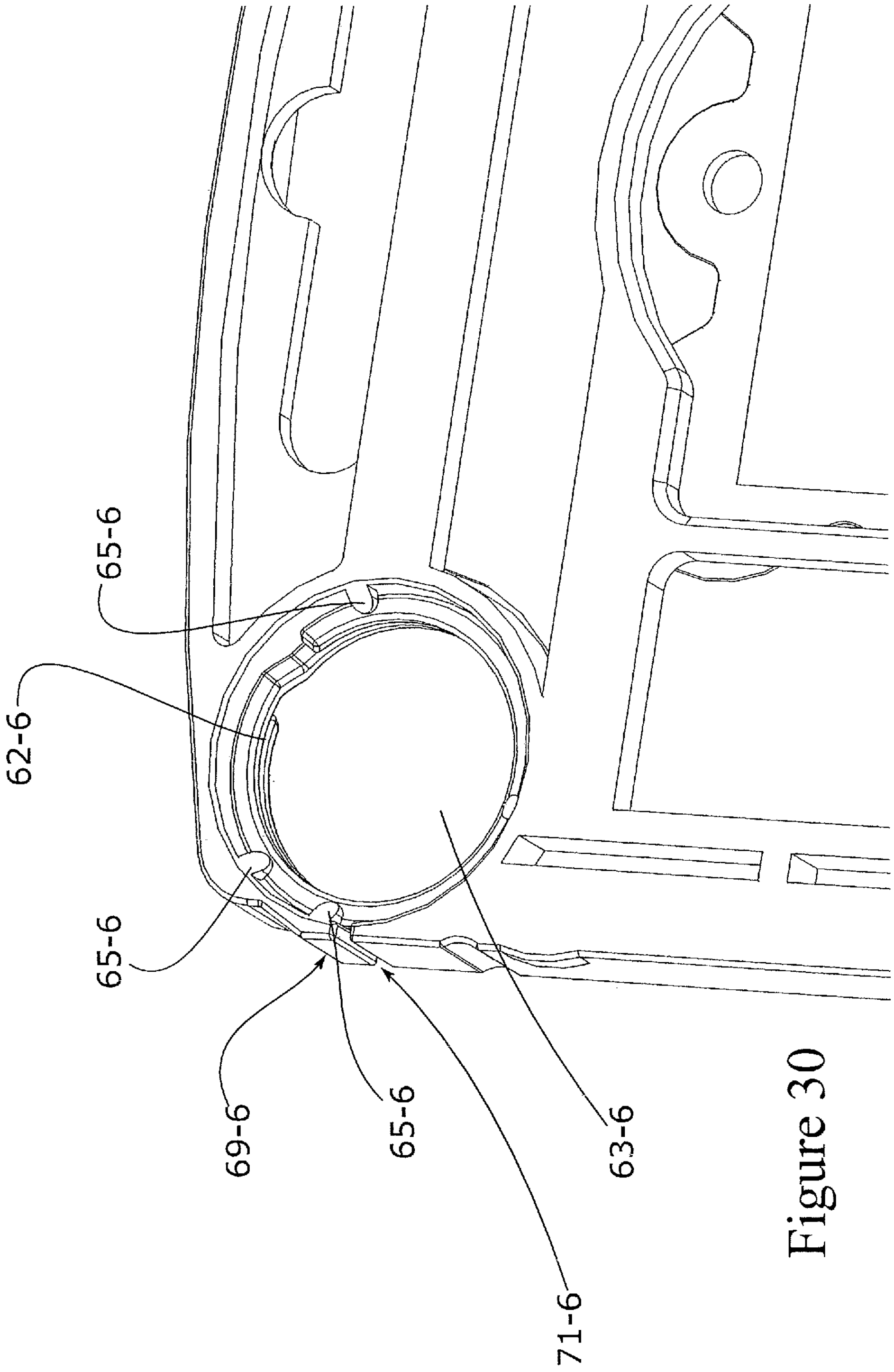
Figure 31:
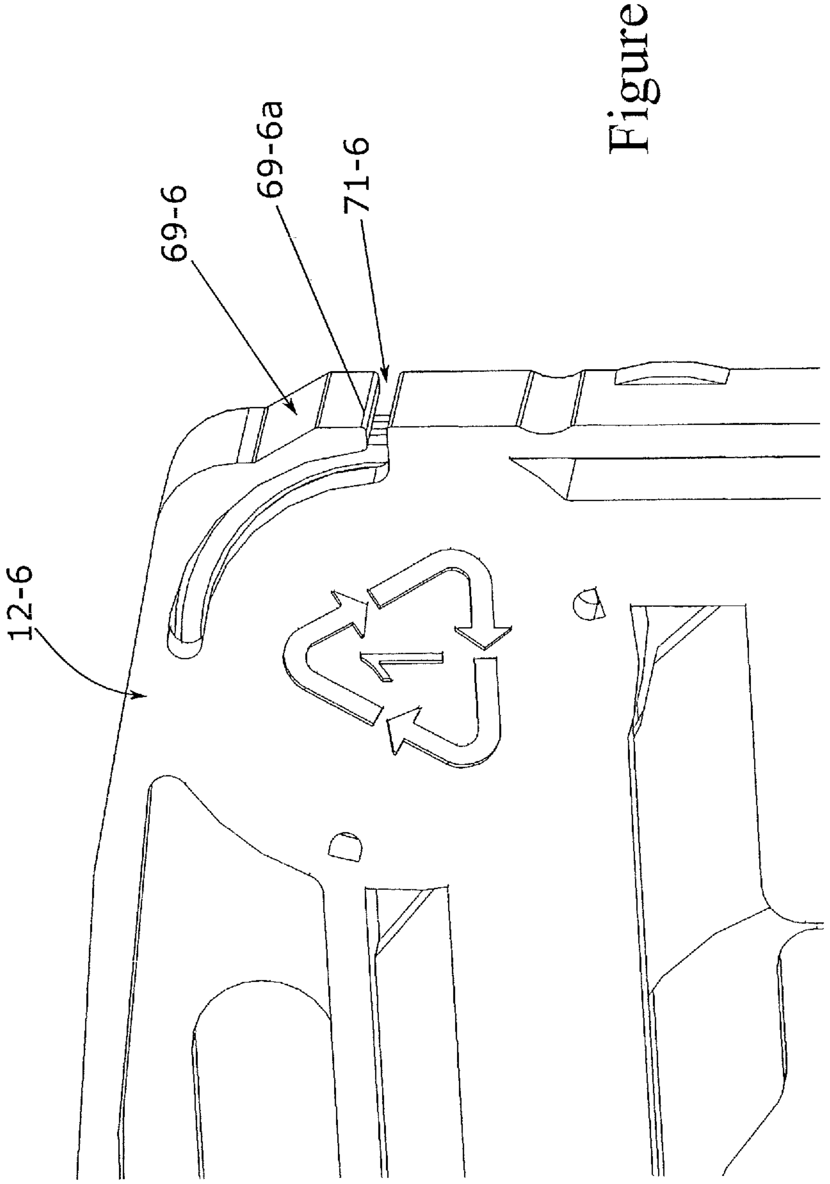

It is to be clearly understood that the above description is intended by way of illustration and example only, is not intended to be taken by way of limitation, and that other changes and modifications are possible. For example, FIGS. 22 and 23 show another embodiment of a cassette body 12-4, which is similar to cassette body 12-2 in terms of providing a tag seating recess with retention tabs, but where the cassette body 12-4 is formed of a one piece embossed/staked paperboard or a molded or die cut card that is embossed/staked. FIGS. 24 and 25 show another embodiment of a cassette body 12-5 that is formed by a folded paperboard material having a living hinge 140, where the tag would be captured between the folds in the vicinity of the opening 142. Still other variations and additional features are possible.

What is claimed is:

1. A tag cassette assembly for use in connection with an engraving process carried out in an engraving machine, the assembly comprising:

a single piece cassette body of plastic material, the cassette body including a first major side and a second major side and a periphery formed by minor edges;

a tag secured in a capture space of the cassette body, the capture space formed, at least in part, by a lateral slot formed along one of the minor edges and through which the tag is insertable into and removable from the capture space;

wherein the first major side is configured to provide access to a first side of the tag to facilitate engraving and the second major side is configured to provide access to a second side of the tag to facilitate engraving;

wherein the cassette body further includes a recess in which an attachment ring is held.

2. The tag cassette assembly of claim 1, wherein the recess in which the attachment ring is held is offset from the capture space.

3. The tag cassette assembly of claim 2, wherein the recess in which the attachment ring is held includes a bottom defined by the second major side, and at least one ring retaining tab at the first major side for securing the attachment ring within the recess and against the bottom.

4. The tag cassette assembly of claim 3, wherein a periphery of the recess is defined at least in part by a removable finger that is configured to be manually broken away from the cassette body.

5. The tag cassette assembly of claim 4, wherein the recess includes multiple ring retaining tabs, and at least one of the ring retaining tabs is on the removable finger.

6. The tag cassette assembly of claim 2, wherein the recess in which the attachment ring is held includes an unbounded side portion along a portion of a peripheral edge of the cassette body.

* * * * *